United States Patent [19]

Thelen et al.

[11] Patent Number: 4,830,233

[45] Date of Patent: May 16, 1989

[54] SLUICE TYPE APPARATUS FOR DISCHARGING MATERIAL BATCHES

[75] Inventors: Hubert Thelen; Menrad Wesp, both of Herzogenrath, Fed. Rep. of Germany

[73] Assignee: Eschweiler Bergwerks-Verein AG, Herzogenrath-Kohlscheid, Fed. Rep. of Germany

[21] Appl. No.: 73,995

[22] Filed: Jul. 16, 1987

[30] Foreign Application Priority Data

Jul. 23, 1986 [DE] Fed. Rep. of Germany ....... 3624867

[51] Int. Cl.$^4$ ............................................. G01F 11/28
[52] U.S. Cl. ..................... 222/450; 222/504; 222/542; 222/561; 105/282.2; 251/212; 414/221
[58] Field of Search ............... 222/450, 545, 561, 504, 222/542, 476, 425, 451, 445–447, 512; 414/221, 217; 137/613; 251/212; 277/138, 149, 150, 165; 105/282.1–282.3

[56] References Cited

U.S. PATENT DOCUMENTS

| | | | |
|---|---|---|---|
| 2,915,022 | 12/1959 | Dorey | 221/561 X |
| 3,190,509 | 6/1965 | Kirchhoefer | 414/221 X |
| 3,232,494 | 2/1966 | Poarch | 414/221 X |
| 3,262,610 | 7/1966 | Jordan | 222/450 X |
| 3,303,974 | 2/1967 | Bleueler | 222/445 |
| 3,834,595 | 9/1974 | Brock et al. | 222/504 |
| 4,060,183 | 11/1977 | Puurunen | 220/450 X |
| 4,221,307 | 9/1980 | Peterson | 220/450 X |

FOREIGN PATENT DOCUMENTS

| | | | |
|---|---|---|---|
| 972624 | 8/1975 | Canada | 105/282.2 |
| 3335860 | 4/1985 | Fed. Rep. of Germany . | |
| 8005787 | 5/1982 | Netherlands . | |
| 442671 | 2/1936 | United Kingdom | 277/150 |
| 812189 | 4/1959 | United Kingdom | 222/450 |

Primary Examiner—Kevin P. Shaver
Assistant Examiner—Gregory L. Huson
Attorney, Agent, or Firm—W. G. Fasse; D. H. Kane, Jr.

[57] ABSTRACT

A sluice type apparatus for discharging batches of material from a pressurized enclosure has a container with an upper inlet and a lower outlet each closable by a slide gate. Preferably, each slide gate has two slide gate members driven by respective piston cylinder devices so that one gate is closed while the other gate is open and vice versa. At least the slide gate members for opening and closing the inlet are withdrawn from their inlet closing position into a respective outwardly closed or sealed chamber for making it easier to keep the container pressurized. The seals between the chamber entrance slots and the respective slide gate member are not required to be precision seals because any material that may pass into these outwardly closed or sealed chambers is easily removed again.

13 Claims, 4 Drawing Sheets

SLUICE TYPE APPARATUS FOR DISCHARGING MATERIAL BATCHES

FIELD OF THE INVENTION

The invention relates to a sluice type apparatus for discharging batches of material from a pressurized enclosure. Such a sluice type apparatus is used where large quantities of flowable bulk materials are pressure treated and then must be transferred from a pressurized enclosure into another environment such as a nonpressurized enclosure.

DESCRIPTION OF THE PRIOR ART

Sluice type devices usually comprise a box type container having an inlet opening at its top and an outlet opening at its bottom. The openings are selectively closable so that the container may be filled when its inlet opening at the top is open while the outlet opening at the bottom is closed and while the inlet opening is connected to a pressurized enclosure, for example a conduit leading from a pressurized treatment chamber to the sluice type container. Further, when the inlet opening is closed, and the outlet opening is open, the apparatus may be connected to a discharge conduit in which the initially pressurized material is depressurized.

Prior art sluices of this type are well known, but have the disadvantage that the transfer of the material from the pressurized enclosure into the sluice box causes substantial pressure drops in the pressurized enclosure. Such pressure drops are undesirable, for example, in connection with a pressure filter in which, for example, sludge or the like is introduced into a pressurized enclosure in which liquid is withdrawn from the sludge an from which the concentrate must be removed again. A pressure drop in such a pressure filter system may lead to substantial operating troubles or even breakdowns, whereby the efficiency of the pressure filter process may be substantially diminished.

Netherlands Patent Publication (NL-OS) No. 8,005,787 discloses an apparatus for the batch type or discontinuous removal of material through a sluice in which pressure drops or losses are supposed to be avoided by means of a cone shaped closure at the bottom of a chute or shaft filled with a filter cake. The cone shaped closure is intended to seal the shaft or chute in a pressure tight manner. A hydraulic piston cylinder device is arranged for raising or lowering the conical closure. A substantial disadvantage of this type of construction is seen in that it requires a substantial space in the vertical direction. Further, the conical shape of the closure enhances the possibility of clogging, depending on the consistency of the material to be passed through the sluice.

German Patent Publication (DE-OS) No. 3,335,860 discloses a sluice type apparatus for the discharge of material from a pressurized enclosure in which the construction departs from other conventional cellular wheel sluices in that a cellular housing is movable relative to an inlet and an outlet. Sealing means are provided between the inlet and the cellular housing and the outlet and the cellular housing in such a manner that radially extending sealing gaps are avoided. Such radial sealing gaps are troublesome in conventional cellular wheel sluices in which a cellular wheel is rotatable in a stationary housing and thus requires expensive radially effective seals. In the apparatus according to German Patent Publication (DE-OS) No. 3,335,860 the seals are constructed as two parallel slide plates between which the cellular housing with its individual cells is arranged for a rotational movement.

However, practical experience has shown that the rotatable cellular housing either requires a relatively large drive power due to the highly loaded seals, or the sealing requirements are not satisfied, especially in connection with pressure filter techniques. The rotational movement of the cellular housing exposes the seals to high wear and tear and driving the entire cellular housing is not efficient.

OBJECTS OF THE INVENTION

In view of the foregoing it is the aim of the invention to achieve the following objects singly or in combination:

to provide a sluice type apparatus which avoids the drawbacks of the prior art, more specifically, which avoids rotational structural components and which is constructed so as to substantially not restrict the through-flow passage of the material;

to assure an efficient filling of the sluice container while minimizing any pressure drop in the pressurized enclosure to which the sluice container is connected and to also assure an efficient discharge once the sluice container is filled;

to move at least the inlet controlling slide gate members into a sealed chamber so as to prevent a pressure drop, especially during the opening movement of the slide gate members of the inlet; and to construct the upper and lower closure structures so that both structures are substantially identical to facilitate standardization.

SUMMARY OF THE INVENTION

The sluice type apparatus according to the invention is characterized in that the cross-sectional flow area through the sluice container corresponds substantially to the open area of the inlet and outlet of the sluice container. Each of the inlet and outlet openings is closeable and openable by at least one slide gate member. At least the slide gate member for the inlet opening is movable into an outwardly sealed chamber for minimizing pressure drops when the sluice container is opened and also when it is being filled. Each slide gate member is operated by a piston cylinder device.

By making the cross-sectional flow area of the inlet and outlet as large as the container cross-section, and by making the slide gate members movable completely out of the cross-sectional flow area, the invention assures that the material does not have to travel through a restricted cross-sectional flow area, whereby clogging is avoided. Another advantage of this feature is seen in that a rapid changing and discharging of material batches is assured. Further, by moving at least the slide gate member or members, which closes the inlet opening into a pressure sealed chamber, a pressure drop due to movement of the slide gate member or members is prevented because the excess pressure in the sluice container is also present in the chamber or chambers into which the slide gate member or members are withdrawn through respective guide slots. The pressure in these chambers is thus substantially the same as in the sluice container since the chambers are sealed to the atmosphere. Moreover, the outwardly closed chamber provides a mounting for the piston cylinder drives for the slide gates and the cylinders are easily flanged in a pressure tight manner to the respective chamber so that there is no pressure loss through the slide gate drive means.

An efficient structure results by using at least one wall of the sluice container also as a wall for the outwardly sealed chamber or chambers into which the slide gates are withdrawn. A slot is provided in the common wall at least for each slide gate closing the inlet and such slots provide a proper guide for the respective slide gate. The slot can be surrounded by inexpensive seals which are not required to be pressure tight, but merely are provided for keeping the material passing through the sluice container out of the outwardly sealed chamber. It is acceptable even if minor material quantities pass into the chamber because the chambers may be cleaned from time to time. As a result of these features the force needed to press the seals against the slide gates can be very small and the wear and tear on the seals is respectively small. The outwardly closed chamber or chambers ma be provided with an access door for cleaning purposes.

By dividing each slide gate into two slide gate members which are movable in opposite directions, the invention achieves a more rapid opening and closing because each slide gate member needs to move only for half the required total distance. Additionally this feature provides smaller dimensions for each slide gate member so that the stress, especially the bending stress applied to the slide gate members, is substantially smaller than the respective stress applied to a single slide gate.

The division of the slide gates into two slide gate members does not pose any sealing problems because the edges of two slide gate members forming a pair and facing each other, can be constructed to form an effective seal, for example, by a male and female type overlap. If required, sealing strips may be inserted into the edges or the edges may be covered by an elastic material which provides a good seal. In operation these seals are stationary so that their wear and tear is minimized.

By supporting the slide gates or slide gate members, at relatively closely spaced intervals along the gate edges, it is assured that the gates are properly guided in their movement and that the gates cannot bend out of shape under the compression loads to which they are exposed in operation. Preferably, the gate supports are studs having a flattened surface in contact with the bottom of the respective gate or gate member. These studs can be relatively short and are thus easily located out of the flow cross-sectional area so as not to interfere with the material flow into the sluice container and out of the sluice container. Further, the flattened surfaces may be easily lubricated to assure a minimum friction for the movement of the gates.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
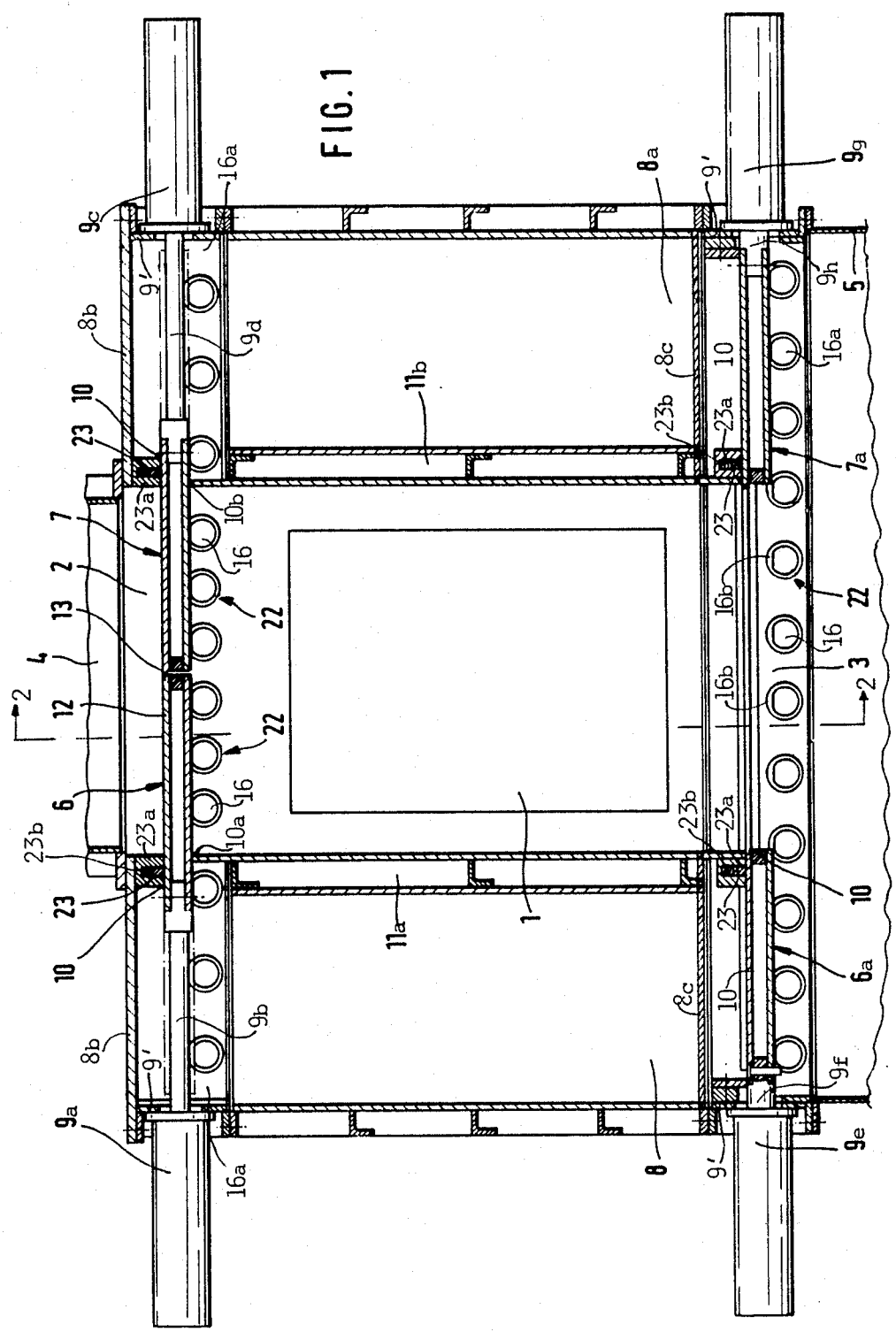
FIG. 1 is a vertical section substantially along section line 1—1 in FIG. 2.
Figure 2:
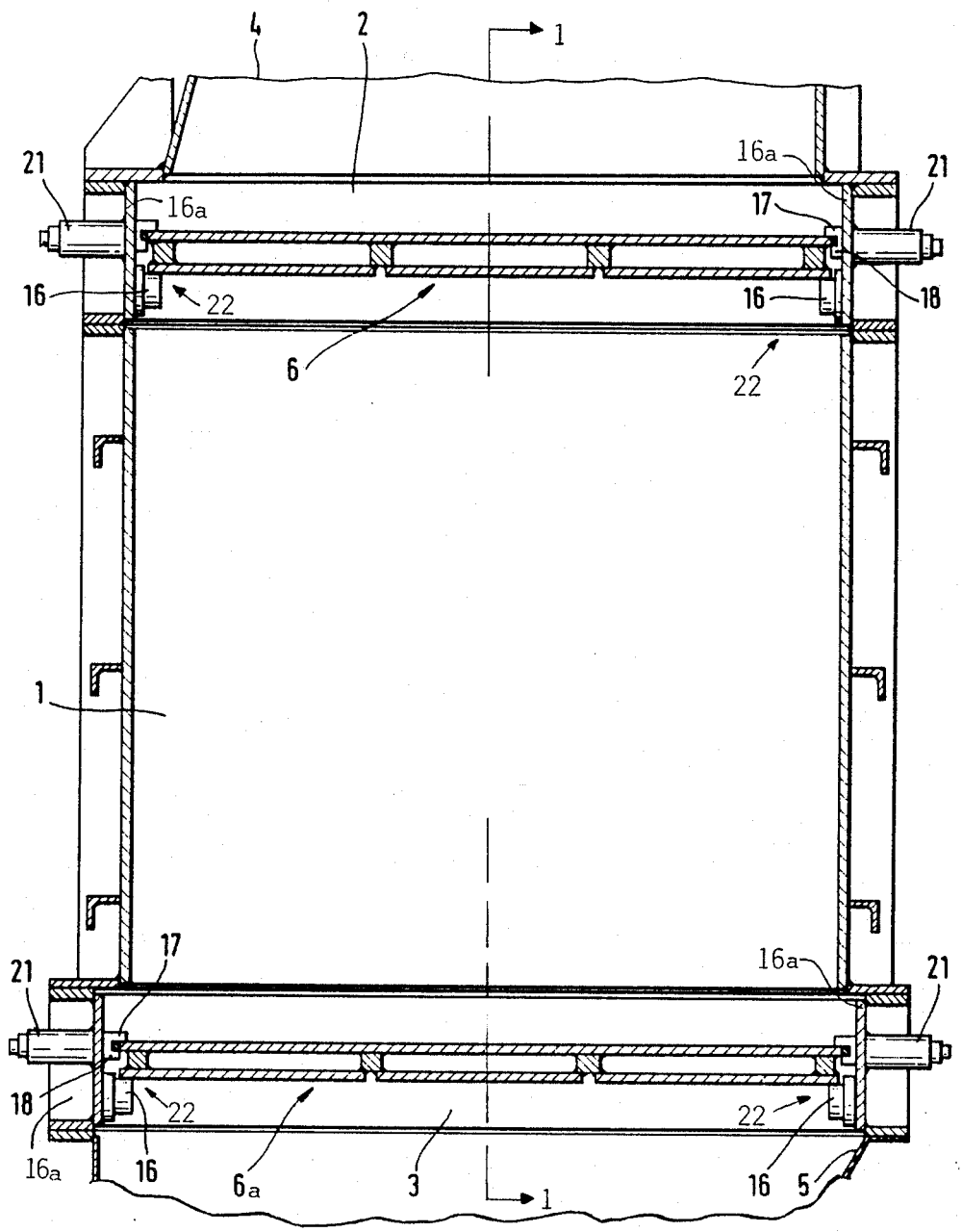
FIG. 2 is a sectional view substantially along section line 2—2 in FIG. 1.

Referring to FIGS. 1 and 2, the present sluice type apparatus comprises a box type sluice container 1 having an inlet 2 at its top and an outlet 3 at its bottom. The inlet at the top is connected to a pressurized enclosure 4 such as a conduit leading, for example, to a pressurized filtering apparatus not shown. The bottom outlet 3 leads into a discharge duct 5 which is not pressurized. The inlet 2 and the outlet 3 have a cross-sectional opening area corresponding approximately to the flow cross-sectional area defined by a horizontal section through the container 1. Thus, restrictions in the through-flow area are avoided, whereby clogging is also avoided. Slide gate means comprising a pair of slide gate members 6 and 7 . open and close the inlet 2. Two slide gate members 6a and 7a are arranged for opening and closing the outlet 3. These gates are operable so that the gate members 6 and 7 are in the closing position as shown in FIG. 1 for keeping the pressurized enclosure 4 under pressure while the gate members 6a and 7a are in the outlet opening position as shown in FIG. 1 for discharging a batch of material into the conduit 5. Thus, when the gate members 6a and 7a are closed, the gate members 6 and 7 are opened and vice versa.

According to the invention at least the slide gate members 6 and 7 are movable into outwardly closed and sealed chambers 8 and 8a respectively. Each chamber 8, 8a has a top cover 8b that may be arranged to be removable to provide a cleaning access into the chambers 8, 8a. The bottom of each chamber 8, 8a is also closed by a wall 8c. The wall 8c could be located below the lower slide gate members 6a, 7a, so that both pairs of slide gate members would be movable into the respective chamber 8, 8a. However, as shown, it is sufficient to primarily move the upper pair of slide gate members 6, 7 into the hermetically sealed chambers 8, 8a to help maintain the pressurization of the container 1 and of the pressurized enclosure 4 as will be described in more detail below. The chamber 8 has an inner lateral wall 11a which may be a common wall with the container 1. The chamber 8a has an inner wall 11b that may also be a common wall with the container 1. A guide slot 10a is provided in the wall 11a. A guide slot 10b is provided in the wall 11b so that the upper slide gate members 6 and 7 may pass through these guide slots respectively for opening and closing the inlet 2. The slide gate member 6 is driven by a piston cylinder device 9a having a piston rod 9b connected to the slide gate member 6. The slide gate member 7 is driven by a piston cylinder device 9c having a piston rod 9d connected to the slide gate member 7. The slide gate member 6a is driven by a piston cylinder device 9e having a piston rod 9f connected to the member 6a. The slide gate member 7a is driven by a piston cylinder device 9g having a piston rod 9h connected to the slide gate member 7a. The piston cylinder devices 9a, 9c, 9e, and 9g, constitute individually controllable drive means for the slide gate members for performing the above mentioned operation so that the inlet 2 is closed when the outlet 3 is open and vice versa. Sealing strips 23 held in a groove of a sealing molding 23a under the bias of spring elements 23b bear against the surface 10 of each of the slide gate members 6, 7, 6a, 7a. These seals can be of relatively simple construction because they are not required to be pressure tight. Rather, the seals 23 contacting the upper slide gate member 6, 7 merely keep the bulk material out of the chamber 8, 8a while the seals 23 contacting the lower slide member 6a, 7a, merely keep the surfaces of these lower slide gate members clean. Similarly, if the bottom 8c of the chambers 8, 8a should be located below the respective slide gate member 6a, 7a, the respective seals 23 would merely prevent material from entering into the chamber rather than providing a pressure tight seal.

Referring to FIGS. 1 and 2 in conjunction, the slide gates 6,7,6a, and 7a are supported by supporting means 22 located along the edges of the respective gate. The supporting means 22 comprise a plurality of studs 16 secured to mounting rails 16a as will be described in more detail below with reference to FIG. 3. Each stud 16 has a flattened surface 16b in contact with the bottom of the respective slide gate member 6, 7, 6a, 7a. These support studs are spaced horizontally from one another sufficiently close so as to prevent any bending of the gates in the closing position Thus, in the area of the respective sluice container 1 the studs 16 may be spaced more closely than in the area of the chamber 8 and 8a.

Figure 3:
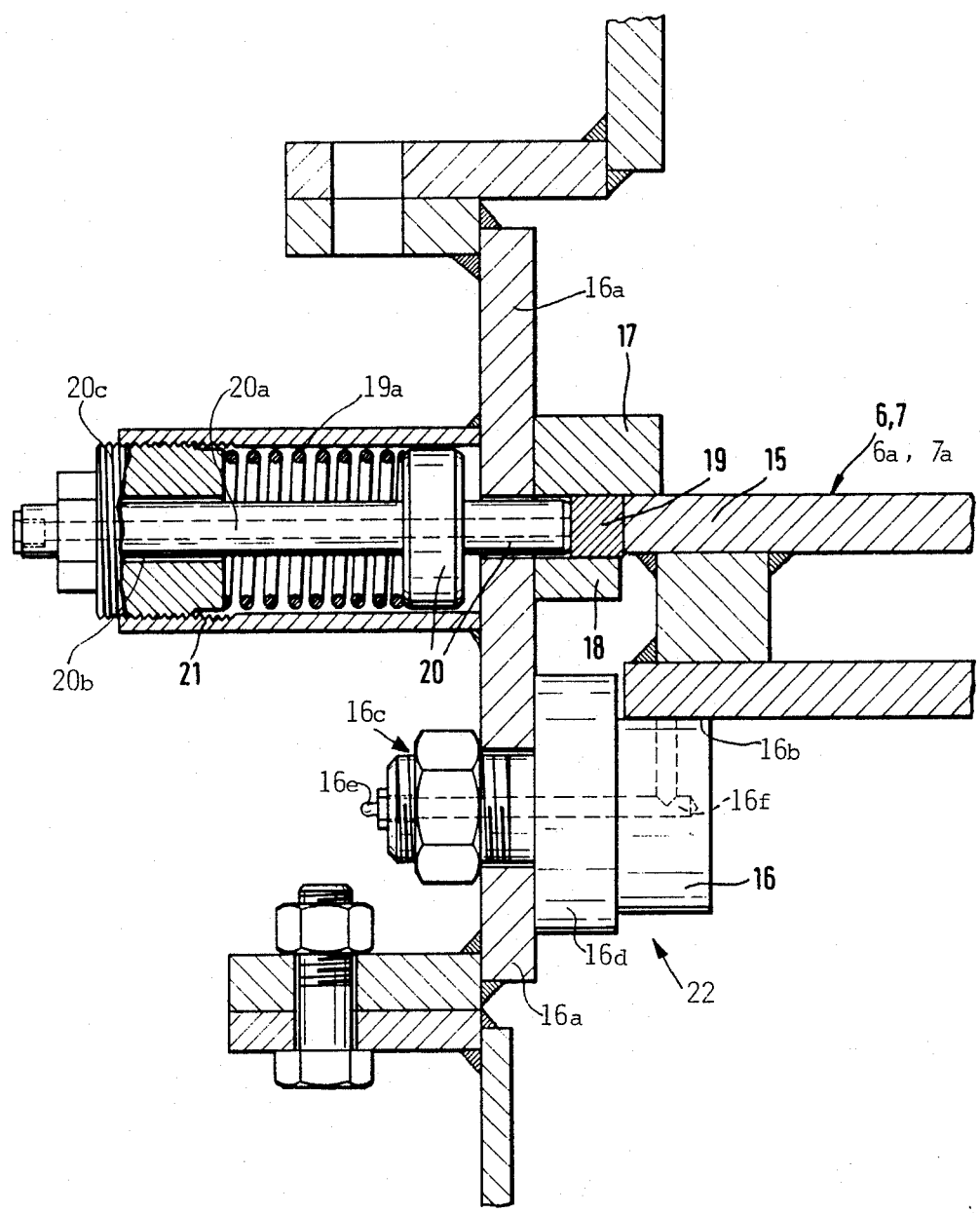
FIG. 3 illustrates, on an enlarged scale, the sealing means and lubricating means for the lateral edges of the slide gate or slide gate members.

Referring to FIG. 3, the support studs 16 are rigidly secured to the mounting rail 16a for example by nut and bolts 16c and a spacer member 16d. A lubricating nipple 116e is connected through a lubricating duct 16f tc the slide and guide surface 16b.

FIG. 3 further shows a sealing device with a sealing strip 19 held in place between moldings 17 and 18 secured to the mounting rail 16a by conventional means. The sealing strip 19 is movable horizontally back and forth under the pressure of a spring 19a held in a cylinder 21 and bearing against a piston 20 rigidly secured to a piston rod 20a which is horizontally slidable back and forth and guided for this purpose by a guide hole 20b in a spring pressure adjustment nut 20c which may be tightened or loosened of adjusting the biasing force of the spring 19a. A plurality of such sealing pressure adjusting devices are arranged alongside the edges of the slide gate members. These devices are secured to the mounting rail 16a and a right-hand end of the piston rod 20a passes through the respective rail 16a. These devices 21 are secured to the mounting rails as also seen in FIG. 2.

Figure 4:
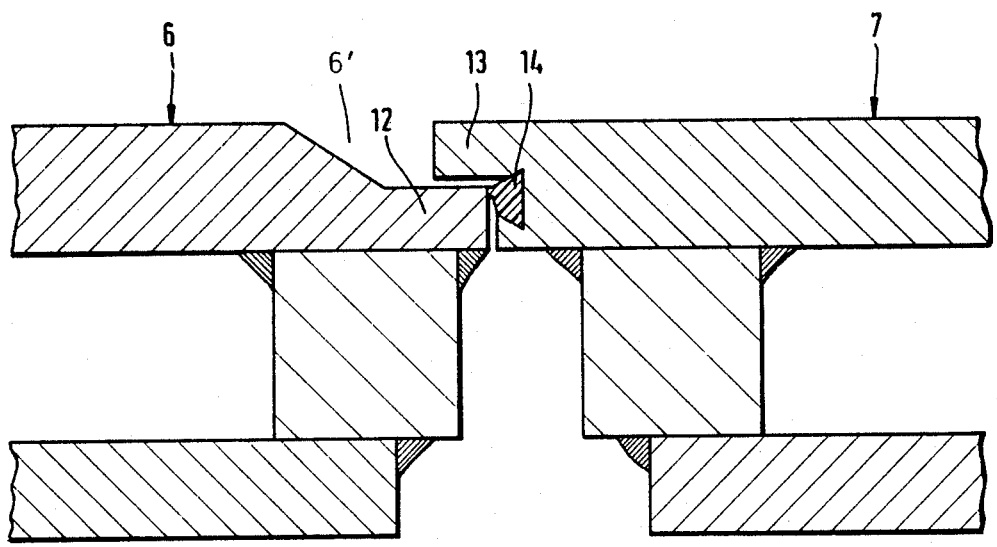
FIG. 4 illustrates the construction of the facing edges of two slide gate members forming a pair.

FIG. 4 illustrates a sectional, enlarged view of the facing edges of the slide gate members 6 and 7. The slide gate member 6 has a depression 6' into which a projecting portion 13 of the gate member 7 reaches to provide a proper seal in the closing position of the gate members shown in FIG. 4. The edge portion 12 below the recess 6' cooperates with the edge portion 13 in providing a proper seal which may be reinforced by a sealing strip 14 as shown.

Incidentally, the piston cylinder devices 9a, 9c, 9e, and 9g may be mounted to rail sections 9' similar to the rail sections 16a whereby the rail sections 9' and 16a together form rectangular boxes of standardized construction for holding the guide studs 16 as well as the sealing devices 21 and 23. The studs 16 may be provided in the form of support blocks cut from either tubular stock having a flat portion on the top to form the guide surface 16b, or from solid round stock also having a flat top portion to form the surface 16b. The gates and their mounting means are all of an identical construction so that an upper slide gate mounting with its gates may be exchanged against a lower slide gate and its mounting. The moldings 17 and 18 form a groove in which the sealing strip 19 is held. The sealing strip 19 may cooperate only with one wall member 15 of the respective slide gate. Preferably, the slide gates are double walled as best seen in FIG. 4. Such double walled construction is well suited to take up the pressure involved.

The sluice according to the invention effectively prevents a pressure drop in the enclosure 4 when material must be moved out of the enclosure 4 which is under pressure. The pressure drop is prevented due to the effective seals provided by the chambers 8 and 8a which are substantially at the same pressure as the container 1 when the slide gate members 6 and 7 are open and when the slide gate members 6a and 7a are closed. It has been found to be acceptable that minor quantities of the material passing through the sluice can enter into the chambers 8 and 8a through the gaps 10a and 10b because the material can be easily cleaned out of the chambers, for example when the apparatus is not in operation, imply by opening the top covers 8b which may be screwed to the mounting rails. It may also be possible to simply detach the upper drive units 9a, 9c, for a cleaning operation. A vacuum cleaner type hose may then easily be inserted into the chambers 8, 8a. Another advantage of the invention is seen in that the present structure may have any desired vertical height so that the present sluice is easily adapted to different requirements. It has been found that the throughput of the present sluice can well be in excess of 150 tons per hour. Further, the seals such as shown at 19 and at 23, are not subject to heavy wear and tear. Besides, these seals can be easily replaced, since they are readily accessible.

Although the invention has been described with reference to specific example embodiments, it will be appreciated that it is intended to cover all modifications and equivalents within the scope of the appended claims.

What we claim is:

1. A sluice type apparatus for discharging batches of material from a pressurized enclosure, comprising pressurizable container means for holding a material batch, said container means having side walls defining a given horizontal container cross-section and through-flow area, a top, and a bottom, an inlet in said top connectable to said pressurized enclosure, an outlet in said bottom, said inlet and said outlet each having an opening area corresponding approximately to said given container cross-section, first upper slide gate means arranged for closing said inlet, second lower slide gate means arranged for closing said outlet, first drive means operatively connected for moving said first upper slide gate means between an inlet closing position and an inlet opening position, second drive means operatively connected for moving said second lower slide gate means between an outlet opening position and an outlet closing position so that said inlet can be opened when said outlet is closed and vice versa, outwardly closed chamber means arranged in such a position that at least said first upper slide gate means are movable into said chamber means by said first drive means when said first drive means move said first upper slide gate means into a container opening position, said apparatus further comprising slide gate support means arranged in said container means under the respective slide gate means, and upper and lower slide gate mounting means located on top of said container means and under said container means, and wherein said slide gate support means are connected to said slide gate mounting means, said slide gate support means comprising a plurality of stationary support blocks spaced from each other, each stationary support block having a flattened guide and support surface in contact with a downwardly facing surface of the respective slide gate means, said support blocks being so located relative to said through-flow area that a restriction of said through-flow area by said support blocks is minimized.

2. The apparatus of claim 1, wherein said first and second drive means comprise piston cylinder means for operating said slide gate means, and mounting means for connecting at least said piston cylinder means for driving said first upper slide gate means, to said outwardly closed chamber means in a position for moving at least said first upper slide gate means into and out of said outwardly closed chamber means.

3. The apparatus of claim 1, further comprising lubricating means passing through said support blocks for lubricating said guide and support surface.

4. The apparatus of claim 1, wherein said support blocks are sections of tubular stock having a flat portion to form said guide and support surface.

5. The apparatus of claim 1, wherein said support blocks are sections of round solid stock having a flat portion to form said guide and support surface.

6. The apparatus of claim 1, wherein said upper and lower slide gate mounting means with their respective slide gate means are of identical construction so that said upper slide gate mounting means with its slide gate means is exchangeable against said lower slide gate mounting means with its respective slide gate means and vice versa.

7. The apparatus of claim 1, wherein said side walls of said container means have at least one side wall member which also forms a wall of said outwardly closed chamber means, said side wall member having guide slot means therein through which said slide gate means move, said apparatus further comprising sealing means (23) located alongside said guide slot means for sealing said outwardly closed chamber toward said slide gate means having a compression facing side, said sealing means being arranged on said compression facing side of said slide gate means relative to said pressurized enclosure.

8. The apparatus of claim 7, wherein said sealing means located alongside said guide slot means comprise a groove, a sealing strip in said groove, and spring means in said groove for pressing said sealing strip against said compression facing side of said slide gate means.

9. The apparatus of claim 1, further comprising sealing means and means movably securing said sealing means to said mounting means for cooperation with said slide gate means in providing a pressure tight seal, and pressure biased means for pressing said sealing means against said slide gate means.

10. The apparatus of claim 9, wherein said pressure biased means comprise a plurality of spring biased piston rods arranged for pressing said sealing means against said slide gate means.

11. The apparatus of claim 1, wherein each of said first and second slide gate means comprises a pair of slide gate members, said first and second drive means each comprising two drive devices, one for each slide gate member, for moving the respective slide gate members of a pair in opposite directions, said outwardly closed chamber means comprising two chamber sections arranged on opposite sides of said container means for permitting movement of said slide gate members into the respective chamber section.

12. The apparatus of claim 11, wherein each of said slide gate members has an edge facing the respective edge of the other slide gate member of a pair, said edges having an interlocking configuration so that in the closing position of said slide gate members a pressurization is maintained.

13. The apparatus of claim 12, wherein said edge of one slide gate member of a pair has a recess and wherein said edge of the other slide gate member of the same pair has a projection reaching into said recess when said slide gate members of a pair are in a closing position, said apparatus further comprising sealing means arranged alongside at least one of said edges for providing a pressure tight seal when said slide gate members of a pair are in a closing position.

* * * * *